J. C. WELLS.
SPLIT BRIDGE LENS ATTACHMENT.
APPLICATION FILED NOV. 23, 1912.
1,099,273.
Patented June 9, 1914.
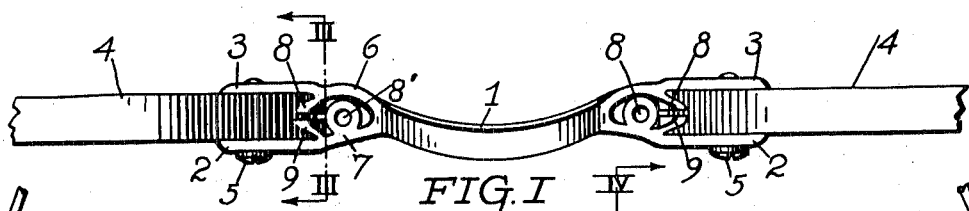
FIG. I
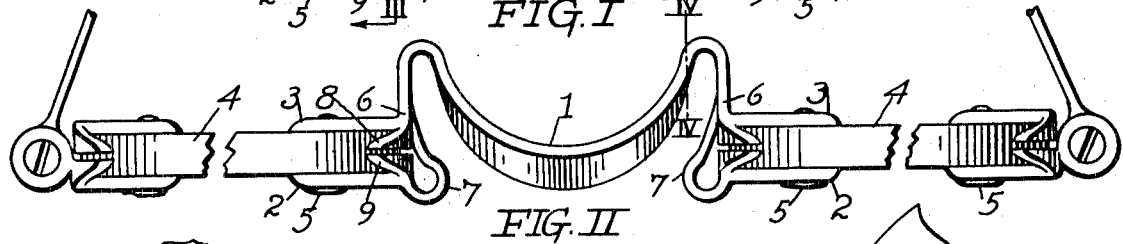
FIG. II
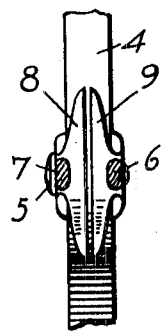
FIG. III
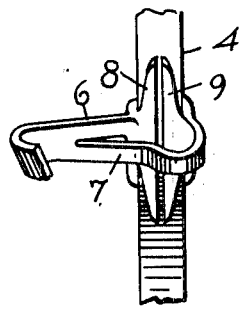
FIG. IV
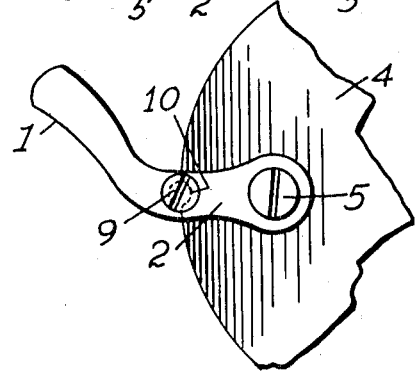
FIG. V
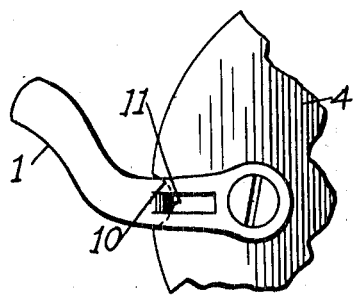
FIG. VI
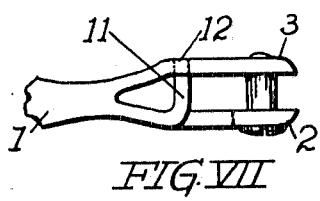
FIG. VII
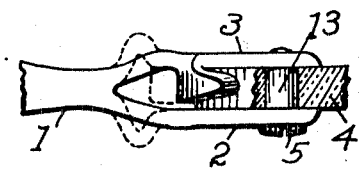
FIG. VIII
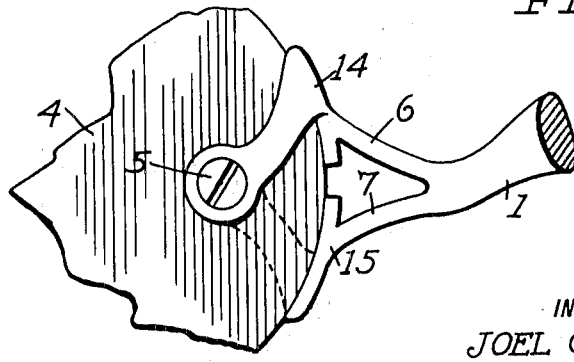
FIG. IX
WITNESSES:
Joseph J. Demers
Maurice D. Herman
INVENTOR
JOEL C. WELLS
By
H. H. Stytt & H. K. Parsons
ATTORNEYS

UNITED STATES PATENT OFFICE.

JOEL C. WELLS, OF SOUTHBRIDGE, MASSACHUSETTS.

SPLIT-BRIDGE LENS ATTACHMENT.

1,099,273.  Specification of Letters Patent.  Patented June 9, 1914.

Application filed November 23, 1912. Serial No. 733,022.

*To all whom it may concern:*

Be it known that I, JOEL C. WELLS, a citizen of the United States, residing at Southbridge, in the county of Worcester and State of Massachusetts, have invented certain new and useful Improvements in Split-Bridge Lens Attachments, of which the following is a specification.

My invention relates to improvements in spectacles and eyeglasses and has particular reference to an improved construction for facilitating the satisfactory attachment of the lenses to the central portion of a rimless mounting.

The leading object of my invention is the provision of a novel and improved structure in which the lens engaging ears may be quickly and satisfactorily adjusted to receive lenses of varying thicknesses.

Another object of my invention is the provision of a structure of this nature which shall be neat and attractive in appearance and which will involve no increase in the pupillary distance of the mounting.

Another object of my invention is the provision of an improved lens mounting so constructed as to permit of the adjustment of the lens clip for different thicknesses of lenses and also to permit of slight variations in the pupillary distance by independent adjustment of the lenses.

Other objects and advantages of my improved construction should be readily apparent by reference to the following description taken in connection with the accompanying drawings, and it may be understood that I may make any modifications in the specific details of construction shown and described within the scope of the appended claims without departing from or exceeding the spirit of my invention.

Figure I represents a top plan view of a finger piece mounting embodying my improved bridge and lens clips. Fig. II represents a similar view of a slightly modified construction of saddle bridge spectacle mounting. Fig. III represents a sectional view on the line III—III of Fig. I looking in the direction of the arrow. Fig. IV represents a similar view on the line IV—IV of Fig. II. Fig. V represents a fragmentary view of another modification of my invention. Fig. VI represents a slight modification of the idea shown in Fig. V. Fig. VII represents a plan view of Fig. VI. Fig. VIII represents a fragmentary plan view of a further modification, and Fig. IX represents a front elevation of another variation thereof.

In the drawings, in which similar characters of reference are employed to denote corresponding parts throughout the several views the numeral 1 designates an eyeglass bridge which may be of either the C or the saddle type, while the numerals 2 and 3 denote the ears for engaging the lens 4, said ears being preferably connected by the lens clamp screw 5 extending transversely through an aperture in the lens.

Referring particularly to that form of my invention shown in Figs. I and III, it will be observed that the bridge end instead of being fastened to the strap portion of the lens clip in the usual manner, is split adjacent the terminus of the arch thereof to provide the furcations 6 and 7, the furcation 7 bearing the lens clip ear 2, while the furcation 6 bears the lens clip ear 3 while the strap is split to provide the pair of strap sections 8 and 9 for engaging the edge of the lens to prevent rocking movement thereof on the lens screw 5. It will thus be seen that the clip ears 2 and 3 are entirely independent of each other and may readily be adjusted with respect to each other by bending of the furcations 6 and 7 of the bridge. In Fig. I, I have illustrated this form of my invention as applied to a finger piece eyeglass, a lug or ear 8' carried by one of the furcations of the bridge affording a seat for the pivot screw.

In Figs. II and IV, I have shown a slight modification of my invention in that instead of the end of the bridge running directly into the lens clip the bridge is bent into the saddle type and consequently approaches the lens clip parallel to the edge of the lens, thus presenting a slightly different appearance although the construction is the same in all essential respects.

In Fig. V, I have shown a form of my invention which may be easily constructed and applied to any thickness of lens and will very satisfactorily retain the lens. In this form of my invention I employ the furcations 6 and 7 terminating in the lens clip ears 2 and 3 respectively, but I eliminate the use of the split strap members 8 and 9. In place of employing these members I perforate the clip ears near the terminus of the bridge furcations and pass through said perforations the screw or clamping member 9 which fits within a recess 10 formed in the edge of the lens, tightening of the clamping member 9 satisfactorily drawing the ears 2 and 3 against the lens and supplementing the action of the clamping member 5, while the fitting of said clamping member into the recess in the lens holds the lens against rocking movement.

In Figs. VI and VII, I employ the same principle as that illustrated in Fig. V but in place of using the supplemental clamping member 9 I stamp and press inward from one of the clip ears the tongue 11 which fits into an aperture 12 formed in the opposite clip ear; this member extending transversely through the recess 10 in the edge of the lens and being supported by the clip ears at both ends satisfactorily prevents rocking of the lens while providing an extremely neat and simple construction.

Fig. VIII shows a slight variation of the construction illustrated in Fig. I, in that instead of the strap being split the entire strap is carried by one of the clip ears while I also secure to or form integral with the said clip ear a lug or bushing 13 adapted to fit into the aperture in the lens and to engage the lens clamp member 5.

In Fig. IX, I have shown the furcations 6 and 7 of the bridge vertically disposed instead of horizontally, as is illustrated in most of the other figures of my drawings, and in this view instead of splitting the strap vertically, as in Fig. I, I split the same horizontally into the sections 14 and 15, each of which sections bears an angularly disposed clip ear, these ears being disposed on opposite sides of the lens and being connected by the member 5 to securely clamp a lens therebetween.

It is to be noted that in the majority of the forms of my invention I have provided a bridge split adjacent the arch portion which rests on the nose of the wearer into a pair of diverging furcations which terminate in lens clip ears, the divergence of said furcations bearing their separate ears permitting of the ready adjustment of said ears as desired. These diverging furcations, however, serve for an additional purpose in my construction in that after the clip ears have been adjusted to the required thickness of lens, should it be desired to move the lenses in slightly toward the nose or out therefrom, it is merely necessary to hold the clip ears against the lens, as with a pair of pliers, and then spread or contract the two furcations, as indicated, for example, by the dotted lines in Fig. VIII, this spreading or contracting of the furcations drawing the lens in or throwing it out, as desired, to attain the correct pupillary adjustment of the individual lenses.

I claim:

1. The combination with a bridge, of a lens clip embodying strap and ear portions carried thereby, the terminal portion of said bridge and the strap being vertically split.

2. The combination with a bridge, of a pair of integral furcations projecting from the end thereof, co-extensive means for engaging the edge of a lens carried by each of the said furcations, and lens clip ears carried by the furcations and disposed exterior to the means for engaging the edge of the lens.

3. A lens mounting including a bridge terminating in looped pliable portions and coöperating lens clip sections comprising co-extensive strap portions and opposed clip ears carried by the pliable portions.

4. The combination with a bridge split to form arms at the end thereof, of lens clip ears carried by the arms, similar and co-extensive members carried by the arms for engaging the edge of a lens, and a pivot seat carried by one of the arms intermediate the edge engaging member and the bridge.

5. The combination with a bridge split to form arms at the end thereof, of lens clip ears carried by the arms, similar and co-extensive members carried by the arms for engaging the edge of a lens, and a pivot seat carried by one of the arms intermediate the edge engaging member and the bridge, said seat being located between the two arms of the bridge.

In testimony whereof I affix my signature in presence of two witnesses.

JOEL C. WELLS.

Witnesses:
H. K. PARSONS,
M. D. HERMAN.